United States Patent [19]
Ikeda

[11] Patent Number: 5,375,888
[45] Date of Patent: Dec. 27, 1994

[54] PIPE COUPLING FOR REPAIR

[75] Inventor: Shintaro Ikeda, Kusatsu, Japan

[73] Assignee: The Victaulic Company of Japan Limited, Tokyo, Japan

[21] Appl. No.: 19,122

[22] Filed: Feb. 17, 1993

[51] Int. Cl.⁵ ............................................. F16L 55/16
[52] U.S. Cl. ..................................... 285/15; 138/99; 285/373; 285/110
[58] Field of Search .................. 285/15, 110, 373, 415, 285/367; 138/99

[56] References Cited

U.S. PATENT DOCUMENTS

| | | | |
|---|---|---|---|
| 3,550,638 | 12/1970 | Smith | 285/15 |
| 4,049,296 | 9/1977 | Harrison | 285/15 |
| 4,568,091 | 2/1986 | Harrison | 285/15 |
| 4,653,782 | 3/1987 | Munday | 285/15 |
| 4,927,181 | 5/1990 | Ciotola | 285/15 |
| 4,927,182 | 5/1990 | Moore | 285/15 |
| 5,118,139 | 6/1992 | Lott | 285/15 |

FOREIGN PATENT DOCUMENTS

| | | | |
|---|---|---|---|
| 731896 | 6/1955 | United Kingdom . | |
| 733220 | 7/1955 | United Kingdom . | |
| 740433 | 11/1955 | United Kingdom . | |
| 947268 | 1/1964 | United Kingdom . | |
| 1483141 | 8/1977 | United Kingdom | F16L 55/18 |
| 1523882 | 9/1978 | United Kingdom | F16L 41/00 |
| 2189000A | 10/1987 | United Kingdom | F16L 55/16 |
| 2240600A | 8/1991 | United Kingdom | F16L 55/168 |

Primary Examiner—Eric K. Nicholson
Attorney, Agent, or Firm—Frishauf, Holtz, Goodman & Woodward

[57] ABSTRACT

A pipe coupling for repair, includes separate housings and seal rings to be accommodated in the receiving portions formed in the housings, a holding portion being formed on the internal diameter side of the separate end face in the individual housing to receive the projecting seals formed at the separate ends of the above seal rings and the seal rings forming multiple string-shaped ring seals as a single unit between both ends of the above projecting seals by surrounding the portion to be repaired, and having a blocking plug in the above housing for a hole to test the sealing conditions after fixing to a pipe.

1 Claim, 2 Drawing Sheets

PIPE COUPLING FOR REPAIR

BACKGROUND OF THE INVENTION

This invention relates to a pipe coupling for repair and intends to provide a coupling that permits the simple, precise repair of leakage or likely leakage portions in the joints or piping of a laid pipeline without interrupting water passage or gas supply.

In time, after water service pipes and gas pipes are laid, cracks and wear due to aging, corrosion and damage to packing, pipes and joint materials, or degradation of welding occur, thereby causing leakage.

The conventional method adopted for repairing such leakage is to replace faulty portions and thereby renew damaged or worn members for restoration to the original condition.

In some cases, filling material is packed into the portions where leakage occurred.

Such method of replacing faulty portions can indeed attain repair. However, when water or gas passes through a pipeline, this passage must be interrupted, resulting in disruption and inconvenience to consumers living in all downstream areas.

Furthermore, to replace a faulty member, operations must necessarily be performed on the adjacent members connected thereto. Therefore, such replacement requires a considerable number of manhours and is especially labor-intensive in the case of underground pipes.

The method of packing filling material into leaking portions is primitive. When it is difficult to effectively stop leakage due to aging or corrosion, this method will rather enlarge the leaking portions. In particular, for pipelines used under a considerably high pressure condition, this method can be rarely adopted these days.

Such repair is naturally temporary and unsightly and further repair must be executed within a short time.

SUMMARY OF THE INVENTION

The pipe coupling for repair of the present invention comprises separate housings and seal rings to be accommodated in the receiving portions formed in these housings, wherein a holding portion is formed on the internal diameter side of the divided end face in said individual housing to receive the projecting seal formed at the divided end of said seal ring so as to stably fit the seal ring into the housing.

The seal rings fitted into the housings as described above form multiple string-shaped ring seals in a single unit between both ends of said projecting seals, thereby permitting the seal rings to surround the portion being repaired and to be fitted to the pipe body.

The above housings fitted to the pipe portion under repair as described above are provided with a blocking plug for the hole to allow testing of the sealing condition after fitting to the pipe body, thereby enabling testing by removing the blocking plug and applying pressurized liquid or air, or performing pressure reduction by suction after fixing to the portion being repaired, thus completing precise repair.

Fixing of the housing and seal ring as described above can be smoothly performed due to the separate construction while a fluid is passed through the pipeline being repaired.

A clamping seat is provided at both ends of the separate housings and an expanded section is also formed in the middle of the housings to accommodate the clamping seats onto the existing joint provided in the pipe body being repaired, thereby permitting repair at the joint section of a laid pipeline.

BRIEF DESCRIPTION OF THE DRAWINGS

For a more complete understanding of this invention, reference may be made to the following detailed explanations concerning the accompanying drawings wherein.

In these figures, 1 is a housing, 2 is a seal ring, 3 is a bolt nut, 4 is a bolt nut at the existing joint, 5 is an existing joint, 6 is a pipeline, 11 is a receiving groove, 12 is a separate end face, 13 is a holding wall, 14 and 14a are clamping seats, 15 is a clamping seat accommodation portion, 16 is a cut portion, 17 and 18 are plugs, 21 is a ring seal, 21a is an end face of the ring seal, 22 is a projecting seal portion, 22a is the lateral face of the projecting seal, 23 is a groove, 24 is a lip, 25 is a plane end face, 51 is a clamping seat of the existing joint and 51a is a side face of the clamping seat.

DESCRIPTION OF THE PREFERRED EMBODIMENTS

Figure 1:
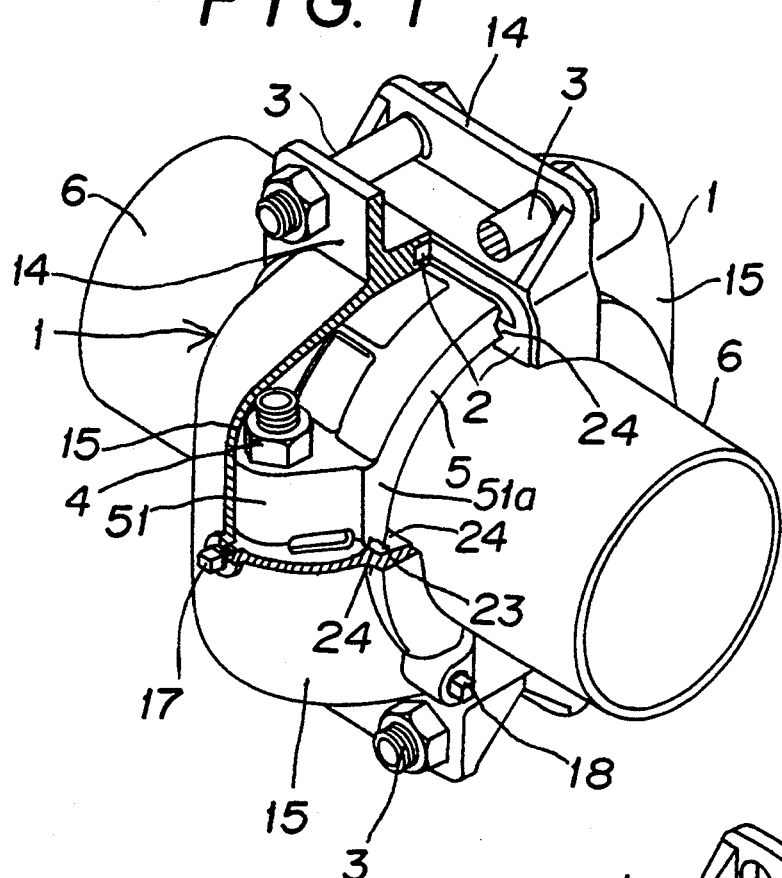
FIG. 1 is a fragmentary broken perspective sectional view indicating an example of the application of the present invention.
Figure 2:
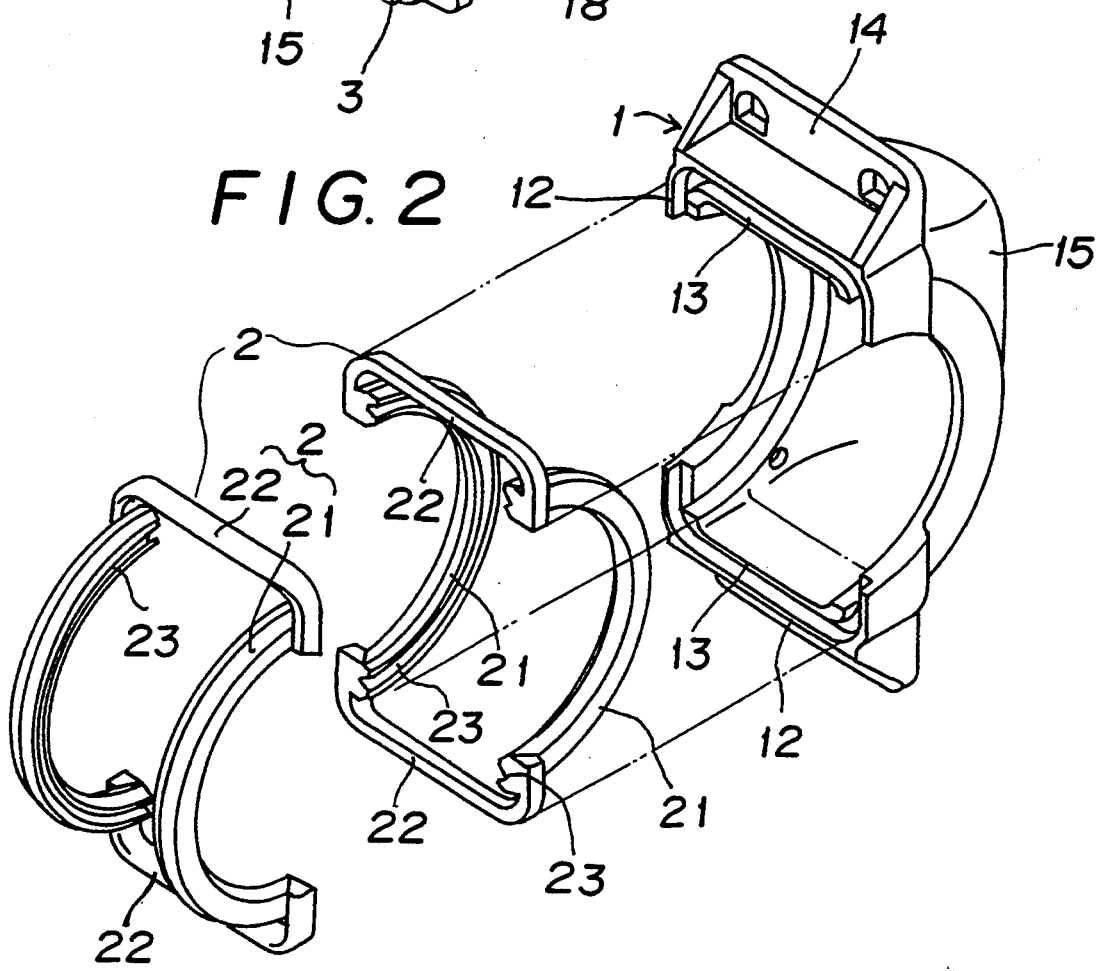
FIG. 2 is an perspective view showing the ring seal of FIG. 1 in disassembled state and the housing on one side.

Referring more particularly to the embodiment of the present invention described above as disclosed in the accompanying drawings, FIG. 1 shows, the pipe coupling for repair including separate housings 1 and 1 and seal rings 2 and 2 to be accommodated in a receiving groove 11 shown in FIG. 2. A holding wall 13 is formed on the internal diameter side on the separate end face 12 in each housing to receive a projecting seal 22 formed at each separate end of the seal ring 2, with circular arc ring seals 21 and 21 being connected between corresponding ends of the projecting seals 22 and 22 in each seal ring 2.

On the outer side on the separate end face 12 of each housing described above, a clamping seat 14 projects outwardly therefrom. Bolts and nuts 3 shown in FIG. 1 are passed through these clamping seats 14 and tightened as shown in the figure.

In a middle part of each housing 1, the clamping seat accommodating portion 15 is expanded to accommodate a clamping seat 51 of the joint 5 tightened by a bolts and nuts 4 in a laid pipeline 6.

Furthermore, a pressurizing plug 17 and air outlet plug 18 are arranged in one or both of the above housings 1 so that testing can be performed using pressurized water or air to check the sealing condition by pressurization or pressure reduction after the pipe coupling for repair is installed.

In the above seal rings 2 shown in FIGS. 1 and 2, a concave groove 23 is formed toward the side face 51a of the above existing joint 5 in the circular arc ring seal 21. That is, it is constructed so as to attain junction sealing at lips 24 and 24 on both sides of groove 23, and a double seal can be formed against leakage from the pipe body side.

Also, a lateral face 22a of each projecting seal 22 and a end face 21a of each corresponding ring seal 21 form a plane end face 25. These plane end faces 25 and 25 can be stably junction-sealed by clamping the housings 1 and 1 together.

Figure 3:
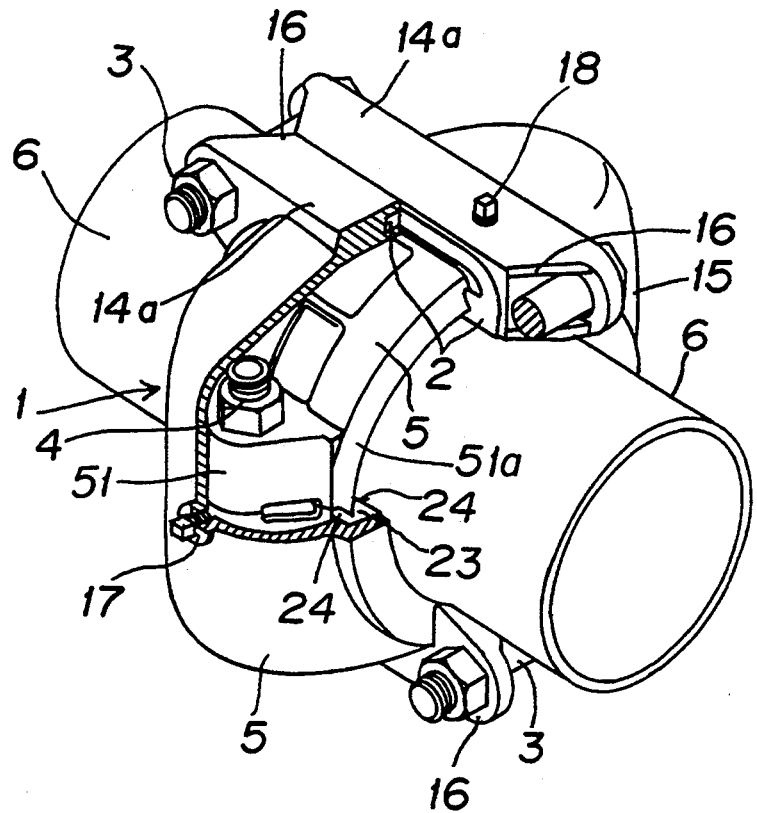
FIG. 3 is a fragmentary broken perspective sectional view, similar to FIG. 1, of another embodiment of this invention.
Figure 4:
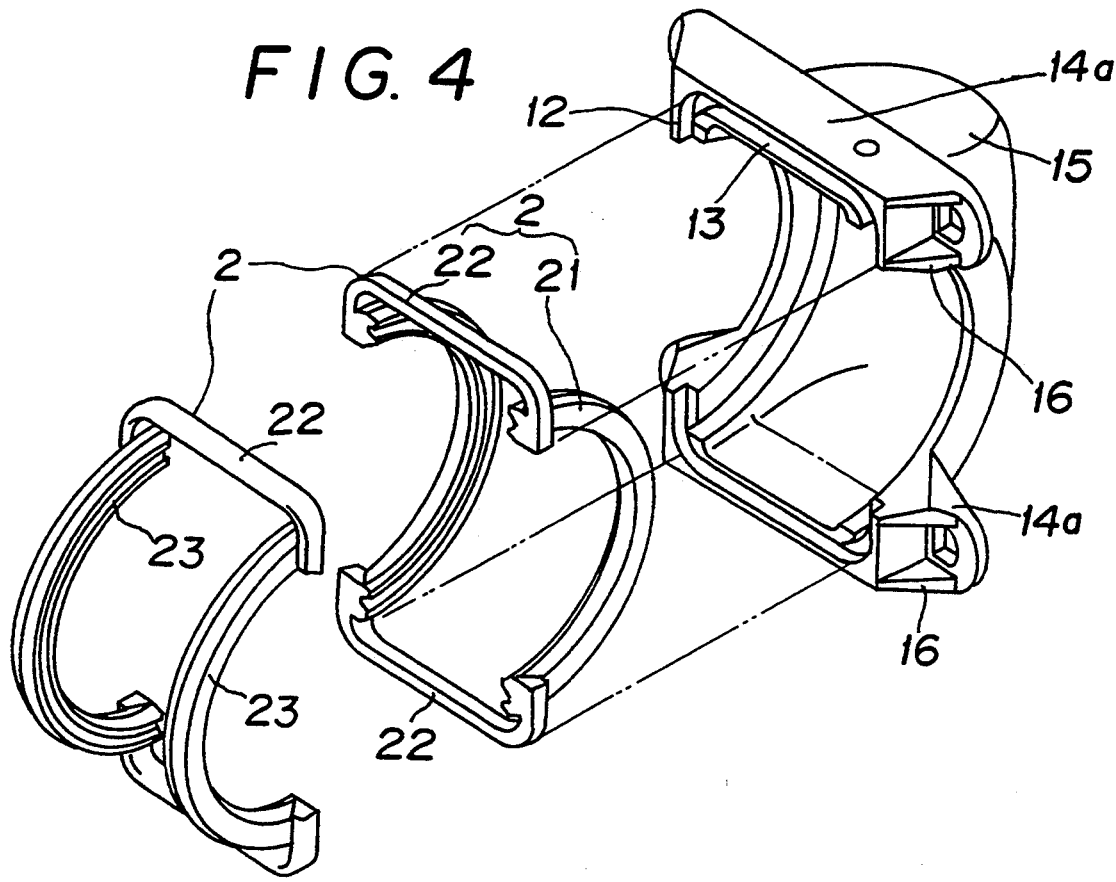
FIG. 4 is an perspective view, similar to FIG. 2, of the same embodiment shown in FIG. 3.

A clamping seal 14a in each housing 1 may be formed in projecting manner as a continuation of the separate end face 12 and extending along the width thereof as shown in FIGS. 3 and 4, instead of setting the clamping seal 14 apart by a proper distance in the radial direction from the separate end face 12 as shown in FIGS. 1 and 2. In addition, a cut portion 16 may be formed in a passage portion, for receiving bolts and nuts 3 at both ends of this clamping seat 14a in the case of FIGS. 3 and 4.

Plug 17 or 18 can be provided on clamping seat 14a shown in FIGS. 3 and 4. Even in this construction, the mounting relationship for seal ring 2 and housing 1 is the same to that described above.

The difference between the embodiments of FIGS. 1 and 2 and that of FIGS. 3 and 4 is the position of the bolts and nuts 3 and 3, namely; whether they are tightly fixed on the outer side in the widthwise direction of the housings 1 and 1 or on the outer side in the radial direction of the housings 1 and 1. The optimum position should be adopted in consideration of the space conditions on the peripheral side of the pipeline to which the coupling for repair of the present invention is applied.

Furthermore, the existing joint 5 in the laid pipeline 6 is generally separated in the horizontal direction and tightly fixed with bolts in the vertical direction as shown in the figure. Accordingly, the pipe coupling for repair of the present invention is designed to position the above separate end face 12 in the vertical direction of the pipeline 6 and install it as shown in the figure, and the bolts and nut 3 are inserted in the horizontal direction to prevent the housings 1 and 1 from enlarging in the transverse direction.

Each clamping seat 14 of the housings 1 and 1 comprises a fitting projection portion and an opening to receive the fitting projection portion which is mutually fixed. This construction does not require insertion or tightening operations for the bolts and nuts 3 on the bottom surface of the laid and connected pipeline 6.

In the case where the present invention is applied to portions for repair which were damaged in the pipeline 6, except joints, the groove 23 and lips 24 and 24 in the above seal ring 2 can be formed in a direction facing toward the outer surface of the pipeline, and the width of the housing 1 can be formed of a adequately large size.

What is claimed is:

1. A pipe coupling for repair, comprising:
   two separate housings, each housing including:
      a receiving portion, and
      opposite divided end faces, each end face having an internal diameter side;
   at least one of said housings including a hole therethrough which provides fluid communication between an outside and an inside of said housing;
   clamping seats projecting from the respective housings for clamping the housings to a pipe joint to be repaired, each clamping seat having a side face, and each of said housings further including expanded means for receiving clamping seats of said pipe joint therein;
   a seal ring accommodated in the receiving portion in each said housing, each seal ring including:
      opposite ends,
         a projecting seal formed at each said opposite end,
         multiple string-shaped ring seals between said projecting seals at said opposite ends, said multiple string-shaped ring seals adapted to surround a portion of a pipe coupling to be repaired,
         each said projecting seal including a lateral face and each said string-shaped ring seal including an end face, and each corresponding lateral face and end face together form a plane end face; and
         each said string-shaped ring seal having an inner side face which faces a side face of said clamping seats of said pipe joint, and a groove formed in a central portion of the inner side face of each said string-shaped ring seal, each said groove facing a side face of said clamping seats of said pipe joint, and each said groove being bounded by lips on opposite sides of said groove, which lips project toward and contact a side face of said clamping seats of said pipe joint.
   holding portion means, formed on the internal diameter side of each said divided end face, for receiving the projecting seals of the ring seals; and
   blocking plug means for removably sealing said hole in said at least one housing to permit testing of sealing conditions of said pipe coupling after said pipe coupling is fixed to the pipe to be repaired.

* * * * *